Aug. 24, 1926.
J. A. VOGEL
1,597,254
STUFFING BOX FOR WATER CLOSET OR HYDRANT VALVES, PUMPS, ETC
Filed August 6, 1924
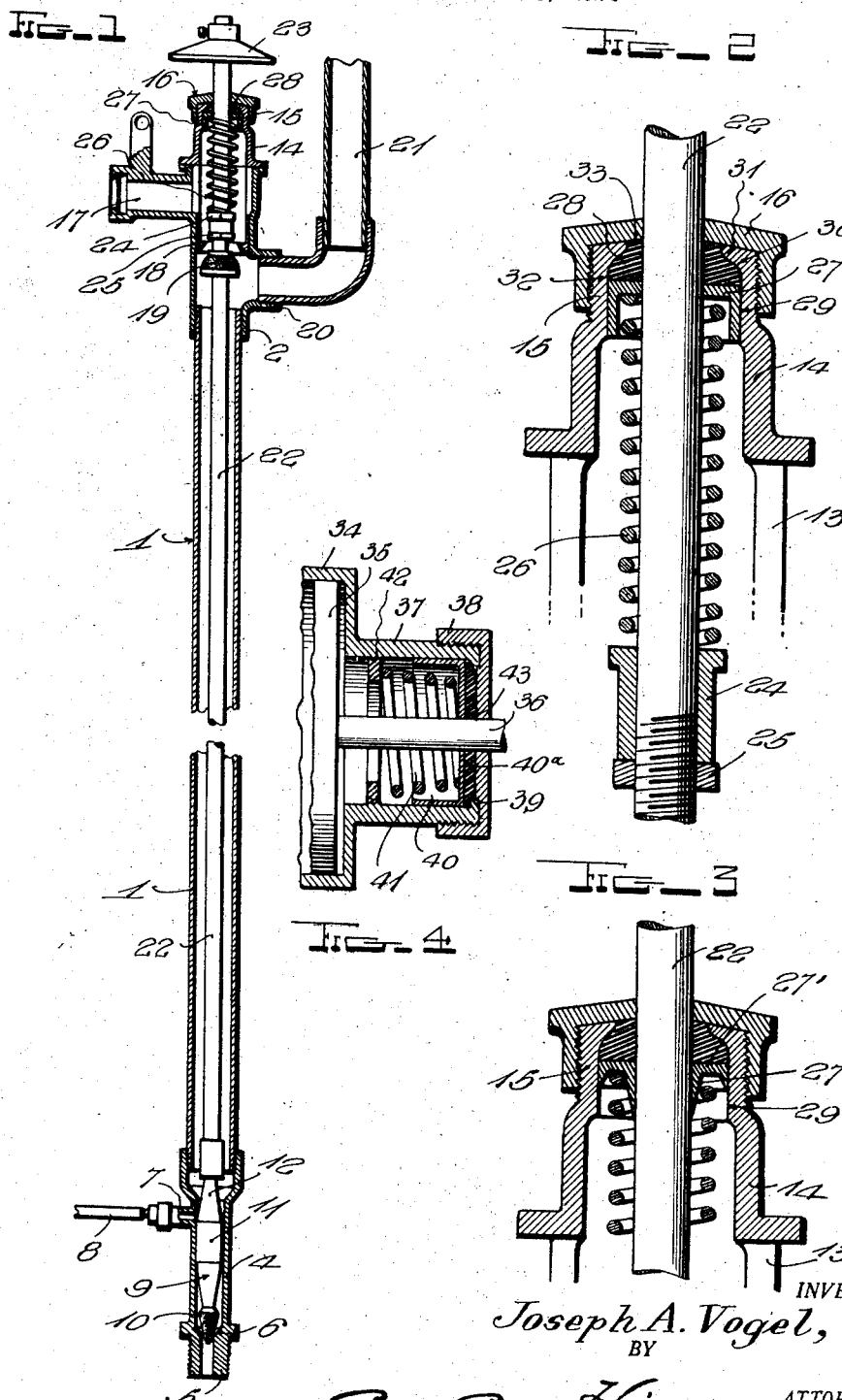
INVENTOR:—
Joseph A. Vogel,
BY
ATTORNEY.

Patented Aug. 24, 1926.

1,597,254

UNITED STATES PATENT OFFICE.

JOSEPH A. VOGEL, OF WILMINGTON, DELAWARE.

STUFFING BOX FOR WATER-CLOSET OR HYDRANT VALVES, PUMPS, ETC.

Application filed August 6, 1924. Serial No. 730,445.

This invention relates to improvements in stuffing boxes for valves, hydrants, pumps, water closet apparatus, and other devices or apparatus wherein it is desired to maintain a water, air, gas or other fluid tight connection between a rod or stem and an opening in a casing or other part into or through which the rod or stem extends, and particularly where the rod or stem has movement in the opening. For purposes of exemplification the invention is herein disclosed as used in a water closet or hydrant construction such as shown in my prior Patent No. 801,754, dated October 10, 1905, and also as used in a pump, such as an automobile pump, but it is to be understood that the invention is not limited to these uses, but may be employed for packing purposes in any type of device for which it is adapted.

One object of my invention is to provide a stuffing box embodying novel means for automatically maintaining a serviceable packing at all times under compression to prevent leakage, while at the same time allowing an old or worn packing to be readily removed and replaced with new packing without dislocation of or interference from the elements whereby the packing is held compressed.

A further object of the invention is to provide a stuffing box having a closure cap for confining the packing therein and a spring-pressed gland or follower for holding the packing in compressed condition, combined with means constructed and arranged for permitting removal of an old packing and substitution of a new packing when the cap is removed, while preventing displacement of the gland or follower and its actuating spring.

A still further object of the invention is to provide a valve having a stuffing box of the character described and in which a single spring is employed for performing the double function of impelling the follower and normally maintaining the valve member in one of its positions and returning it to such position after each valve actuating motion.

A still further object of the invention is to provide a stuffing box or packing structure which is simple of construction, reliable and efficient in action and embodies the use of a minimum number of parts for securing the stated advantages and functions.

The invention consists of the features of construction, combination and arrangement of parts, hereinafter fully described and claimed, reference being had to the accompanying drawing, in which:—

Figure 1 is a vertical sectional view showing the application of my improved stuffing box in association with the casing and rod or stem of the discharge or flush valve of a water closet flush apparatus of the general character described.

Figure 2 is a similar view through the upper portion of the valve casing on an enlarged scale.

Figure 3 is a view similar to Figure 2 illustrating a modification.

Figure 4 is a sectional view showing the application of the invention to a pump, such as an automobile pump.

In the practical application of my improved stuffing box, for purposes of exemplification as herein shown in Figures 1 to 3, inclusive, in which the stuffing box is illustrated in association with the flush valve of a water closet supply and flush mechanism of the general type set forth in my prior Patent No. 801,754, 1 designates a water supply pipe connected at its upper end with the inlet 2 of a discharge or flush valve 3, and connected at its lower end with a valve casing or chamber 4 provided at its lower end with an inlet 5 designed to be connected in practice with a water main or other suitable source of water supply, said valve casing 4 having a valve seat 6 and being provided above the same with a drain outlet 7 communicating with a drain pipe 8. The casing 4 has arranged therein a duplex valve 9 which may be equivalent in structure and function to the valve devices 36—38 of my aforesaid Patent No. 801,-754, said valve having a lower valve member 10 for cooperation with the seat 6 and a peripheral valve surface 11 for cooperation with the drain outlet 7, the valve being hollow or suitably formed to permit upflow of water into the pipe 1 from the inlet 5 when the valve member 10 is unseated, at which time valve member 11 closes the outlet 7, the valve being adapted when in lowered position to cut off the inflow of water from the inlet 5 by engagement of valve member 10 with seat 6, in which movement the surface 11 of the valve uncovers the outlet 7, the upper part of the valve being reduced, as at 12, or otherwise suitably constructed to uncover the outlet 7 and allow any water retained in the pipe 1 at the end of a flushing or discharge action to drain out through the said outlet 7 and pipe 8.

The valve device 3 to which my invention is shown applied comprises a valve body 13 provided with a detachable bonnet section 14 terminating at its upper end in a reduced neck 15 constituting a stuffing-box or packing chamber, said neck being externally threaded to receive an internally threaded closure cap 16. The casing body 13 is provided with a discharge outlet 17 and with a valve seat 18 below said outlet, with which valve seat cooperates the discharge valve or flush valve proper 19, movable downwardly and upwardly respectively for opening or cutting off communication between the inlet end of the valve casing and the discharge outlet 17. In the use of the valve 3 as a flush valve for water closets, the outlet 17 is connected with the closet bowl and the lower end of the valve casing is provided with a passage 20, located below the valve seat 18, for connection with a pipe 21 leading to a water storage tank. A rod or stem 22 extends through the pipe 1 and upwardly through the valve device 3 and its stuffing-box or packing chamber 15 and carries both valve members 9 and 19, a contact head 23 being provided upon the upper end of said rod or stem 22 for engagement by an operating lever or element upon a depressible water closet seat, whereby, when the seat is depressed, the rod 22 and both valves 9 and 10 will be elevated, so as to automatically close the valve member 19 against its seat 18, open the valve member 10 and bring the valve surface 11 into position to close the drain outlet 7, allowing water from the source of supply to flow through the valve 9, pipe 1 and pipe 21 to the storage tank, in which air is compressed by the inflowing water for a subsequent flushing action. When the closet seat is elevated, the rod 22 is forced downward through the action of a valve closing spring, as hereinafter described, thus opening the valve 19 for the flow of water to the bowl and at the same time forcing the valve member 10 to its seat 6 to cut off the flow of water and moving the valve surface 11 out of registry with the passage 7 to allow any surplus water contained in the pipe 1 at the completion of the flushing operation to drain out.

Arranged upon the rod or stem 22 within the valve body 13 is an abutment sleeve 24, which sleeve rests at its base upon an adjusting nut 25 in threaded engagement with the rod or stem. This sleeve forms a support for the lower end of a coiled extensile spring 26, bearing at its lower end against said sleeve and surrounding the rod and bearing at its upper end against the head portion of a gland or follower 27 movable within the neck portion or packing chamber 15 of the cap 14, said spring being compressed and placed under tension when the rod or stem 22 is elevated on the depression of the closet seat to subsequently force said rod or stem downwardly upon the release of the seat, as will be readily understood. The sleeve 24 is adjustable by means of the nut 25 to vary the normal working pressure or tension of the spring 26 as occasion may require.

The gland or follower 27 is cup-shaped and receives and encloses the upper end of the spring, and the head of this follower is arranged to snugly embrace the rod or stem 22 and bear against packing material 28 disposed in the upper portion of said neck 15, the flange of said follower being fitted for sliding motion in the lower portion of the neck and guided thereby. The packing 28, which may be of fibrous material or of any other suitable character, is maintained in compressed condition by the follower 27 and forced closely into engagement with the rod, cap and upper surfaces of the walls of the neck 15 to close the joints against leakage of water. In order that an effective compressing action on the packing may be secured and provision also made to enable the packing to be applied and removed in a convenient manner upon removal of the cap 16 and without displacement of the follower 17 or spring 26, the follower is fitted to slide, as stated, within the lower portion 29 of the neck which is of uniform diameter, and the packing 28 is fitted within the upper portion of the neck which is tapered, as indicated at 30, to form an inwardly extending packing retaining flange 31, the formation of which flange produces a stop flange or shoulder 32 at the point of intersection of the surfaces 29 and 30 to limit the upward movement of the follower 27 under the pressure of the spring 26. The retaining flange 31 may extend inwardly approximately half the distance between the surface 29 and periphery of the rod 22, or to such a degree as to form an effective sealing surface against which the packing is compressed, while leaving an opening 33 at the top of the neck of sufficient size to permit ready and convenient withdrawal, upon removal of the cap 16, of an old and worn packing and the ready and convenient introduction of a new packing, the shoulder 32 limiting the upward movement of the follower 27 when the old packing is withdrawn. By this means it will be apparent that, upon the simple removal of the cap 16, a faulty packing may be removed and a new one substituted in its place, without displacement of the follower and spring from their normal working position and without interference therefrom in the operation of introducing a new packing; also that in such operation the follower will automatically move upwardly against the shoulder 30 to temporarily seal the packing chamber against the outflow of fluid while the chamber is being repacked. Provision is thus made for securing an effective compression of the packing to prevent leakage by means of the same spring which shifts the rod 22 downwardly for a specified movement of the valves, and the ready and convenient repacking of the stuffing-box without displacement of any of its contained working parts and without the necessity of applying, removing or adjusting any of such contained parts in this operation. A discharge or flush valve of maximum simplicity of construction is thus produced which is practically proof against leakage at all times and until renewal of the packing is necessary, and in which a compressing action of the packing is obtained without the use of additional working parts in a valve mechanism of the character described.

With the use of the cup-shaped follower shown in Figures 1 and 2, a follower is provided which is mainly guided by contact with the casing, its flanges having an extended bearing engagement on the casing while its head has a relatively restricted guiding engagement with the rod. In Figure 3, I have shown a modified construction of follower 27′ provided with a sleeve portion 27ª having sliding engagement with the rod, said sleeve carrying a disk or head portion having a short flange to engage the surface 29 of the neck 15, whereby a follower is provided which is mainly in contact with and guided by the rod and is to a more restricted extent in contact with and guided by the casing. Either of these constructions may be employed and will be found effective for the intended purpose, although the cup-shaped form of follower illustrated in Figures 1 and 2 is preferred.

In assembling the parts of the packing means shown in Figures 1, 2 and 3 in the installation of the apparatus, after all the parts of the valve mechanism are assembled with the exception of the bonnet 14 and its contact head 23, the packing material 28 and follower 29 are inserted in the bonnet and the cap 16 loosely or fully applied thereto, after which the bonnet, with its contained and applied parts, as stated, are slipped down over the upper projecting end of the rod 22 until the follower comes in contact with the upper end of the spring 26 and the bonnet rests on the valve body or casing 13, to which valve body or casing the bonnet is bolted or otherwise secured. The cap 16 is then tightened until it is fully applied, if not previously tightened up, and the head 23 fitted on the rod, whereupon the mechanism is ready for use. Instead of initially applying the packing in the bonnet 14, then inserting the follower, and fitting the bonnet in position as described, the bonnet with the follower inserted therein may first be fitted in position and the packing then introduced through the opening 33. Thereafter no removal and reapplication of the bonnet or follower will be required at any time in the use of the apparatus whenever renewal of the packing 28 is necessary, as by means of a suitable tool, upon removal of the head 23 and cap 16, the old packing may be withdrawn or picked out through the opening 33 and new packing material inserted through said opening. Provision is thus made to enable a new packing to be applied whenever necessary without in any manner dismantling or throwing the apparatus out of service beyond the slight time required to remove an old packing and apply a new one in the simple manner specified, which operation, it is obvious, may be easily and quickly performed.

While the valve 3 embodying the stuffing-box constituting my invention has been illustrated as applied for use as a discharge or flush valve in a water closet system of a specified type, it may also be employed in hydrants of generally similar construction and in other types of water or other fluid distributing apparatus where the use of such a valve is desirable. In the application of the valve to frost-proof hydrants, for example, the same general working mechanism as that disclosed may be employed, except that a suitable handle or lever for moving the rod 22 in one direction may be used, the tank connection 21 dispensed with and the outlet 17 made in the form of a spout or otherwise modified as such use may require. In this connection the invention may be employed in conjunction with a known type of hydrant structure in which the valve 9 has a different working action from that herein described, in that the valve member 10 may be arranged to open with the valve member 19 and close therewith, while the valve member 11 is closed when said valve members 10 and 19 are opened, and is opened when said valve members 10 and 19 are closed.

In Figure 4, I have shown the application of the invention to a pump, such as an automobile pump, 34 designating the pump barrel or cylinder, 35 a piston or plunger operating therein, 36 the pump rod or shaft, and 37 the stuffing-box or chamber communicating with one end of the cylinder. The chamber 37 is externally threaded to receive the internally threaded closure cap 38 having an opening through which the rod extends. The chamber is of equal diameter except at its top, where it is provided with an internal flange 39 performing the same function as the flange 31 previously described. A cup-shaped gland or follower 40 presses the compressible packing material 40ᵃ against the underside of said flange and against the surfaces to be sealed, and this follower is pressed outward by a coiled spring 41 disposed between the follower and a suitable abutment 42 in the casing. The flange 39 as here shown contracts the opening 43 at the top of the chamber 37 sufficiently to prevent escape of the follower while permitting ready and convenient replacement of the packing when worn upon removal of the cap.

In the initial assemblage of the parts shown in Figure 4, the follower 40, spring 41 and abutment 42 are fitted in position in the stuffing box 37 and the piston 35 and its rod 36 applied, after which the packing 40ᵃ may be inserted through the opening 43 and the cap 38 applied or the packing may first of all be fitted in advance of the follower in the stuffing box from the inside and the other parts applied in proper order to complete the assemblage in a manner readily understood. The abutment 42 may be threaded or otherwise detachably fitted in position in order that the follower and spring may be inserted at the outset, being thereafter fixed in position so that it need not be disturbed except in the event that, from injury or other cause, the application of a new follower or spring becomes necessary. In the event of the packing 40ᵃ becoming worn and useless, it is only necessary to unscrew the cap 38, withdraw the old packing through the opening 43, insert a new packing through the same opening, and then reapply the cap.

In both types of construction herein described a normally loose fibrous packing may be used which may be inserted and compressed in position and to a desired density by tamping, which tamping may be performed by the same tool used for extracting a worn packing.

Having thus fully described my invention, I claim:—

1. A stuffing box including a packing chamber having an opening in its top, a cap for closing the opening, a rod or stem within said chamber and extending through said opening and cap, an inturned flange on the chamber constricting said opening to a diameter greater than that of the rod but less than that of the chamber, compressible packing material in the chamber and surrounding the rod and bearing against the under side of the flange, a portion of said packing extending into and sealing said opening, and a spring-pressed follower in said chamber and operating to compress the packing material therein, said follower being of the same internal diameter as the chamber and of greater diameter than the flange so as to be limited in outward movement by the flange on removal of the packing, the opening between the flange and rod being of such diameter as to permit withdrawal of the packing material when worn and the repacking of the chamber with new packing material through said opening, without displacement of the follower, upon the detachment of the cap from the casing.

2. A stuffing box including a packing chamber having an opening in its top, said chamber being externally threaded, an internally threaded cap for closing the opening, a rod or stem within the chamber and extending through said opening and the crown of the cap, an inturned flange on the chamber constricting said opening to a diameter greater than that of the rod but less than that of the chamber, compressible packing material in the chamber and surrounding the rod and bearing against the under side of the flange, a portion of said packing extending into and sealing said opening, and a spring-pressed follower in said chamber and operating to compress the packing material therein, said follower being limited in outward movement by the flange when the packing is removed, said opening in the chamber between the flange and rod being of such diameter as to permit withdrawal of a worn packing through the opening and repacking of the chamber through the opening with new packing material upon detachment of the cap, the crown wall of said cap being arranged to bear upon the portion of the packing sealing the opening when said cap is fully applied.

3. A stuffing box including a packing chamber having an opening in its top, the lower portion of the packing chamber being of uniform diameter and the upper portion of said chamber tapering to said opening and thereby providing an inturned flange overhanging the portion of the chamber of uniform diameter, a cap for closing said opening, a rod or stem within said chamber and extending through said opening and cap, compressible packing material in the chamber between the rod and walls of the chamber, said packing having a portion underlying the flange and a portion extending into and sealing the opening, and a spring-actuated follower movable in the portion of the chamber of uniform diameter and limited in upward movement by said flange, the opening between the flange and rod being of such diameter as to permit withdrawal of the packing material when worn and the repacking of the chamber with new packing material through said opening, without displacement of the follower, upon the detachment of the cap from the casing.

4. A stuffing box including a packing chamber having an opening in its top, said chamber being externally threaded, the lower portion of the packing chamber being of uniform diameter and the upper portion of said chamber tapering to said opening, thereby providing an inturned flange overhanging the portion of the chamber of uniform diameter, an internally threaded cap adapted for engagement with the external threads of the chamber, a rod or stem within the chamber and extending through said opening and through the crown of the cap, compressible packing material in the chamber about the rod and between the same and the walls of the chamber, a portion of the packing being arranged to underlie said flange and a portion thereof extending into and sealing said opening, and a spring-pressed follower movable in the portion of the chamber of uniform diameter and limited in upward movement by said flange, the opening between the flange and rod being of such diameter as to permit the withdrawal of the packing material when worn and repacking of the chamber through the opening, without displacement of the follower, upon the detachment of the cap from the casing, the crown of said cap being adapted to bear upon the portion of the packing sealing the opening when said cap is fully applied.

In testimony whereof I affix my signature.

JOSEPH A. VOGEL.